(12) United States Patent
Christian et al.

(10) Patent No.: US 9,826,774 B2
(45) Date of Patent: Nov. 28, 2017

(54) CONTAINER ASSEMBLY THAT ADDS DRY FLAVORING TO A NECK OF A BOTTLE

(71) Applicants: Steven Christian, Houston, TX (US);
Ronald G Presswood, Jr., Houston, TX (US)

(72) Inventors: Steven Christian, Houston, TX (US);
Ronald G Presswood, Jr., Houston, TX (US)

( * ) Notice: Subject to any disclaimer, the term of this patent is extended or adjusted under 35 U.S.C. 154(b) by 95 days.

(21) Appl. No.: 15/081,879

(22) Filed: Mar. 26, 2016

(65) Prior Publication Data

US 2016/0286849 A1    Oct. 6, 2016

Related U.S. Application Data

(60) Provisional application No. 62/140,187, filed on Mar. 30, 2015.

(51) Int. Cl.
*B65D 1/02* (2006.01)
*B65D 1/36* (2006.01)
*A23P 1/08* (2006.01)

(52) U.S. Cl.
CPC ............ *A23P 1/081* (2013.01); *B65D 1/36* (2013.01); *B65D 2203/12* (2013.01)

(58) Field of Classification Search
CPC ...... B65D 81/023; B65D 81/24; B65D 81/34; B65D 81/36; B65D 25/04; B65D 51/28; B65D 51/32; B65D 81/32; B65D 81/3216; B65D 81/3294; B65D 85/322; B65D 1/243; B65D 5/8085; B65D 23/0842; B65D 23/0857; B65D 23/0885; B65D 55/12; B65D 77/0426; B65D 77/0493; B65D 81/3283; B65D 81/3453; B65D 2251/07; B65D 83/06; B65D 2203/12; A47G 23/0633; A21C 15/002; A23G 4/025
USPC ............ 217/26.5, 61; 53/49, 48.1; 206/219, 206/221; 220/23.87, 23.88, 23.89; 118/26
See application file for complete search history.

(56) References Cited

U.S. PATENT DOCUMENTS

| | | | | |
|---|---|---|---|---|
| 3,450,096 A * | 6/1969 | Lancette | ............... | A47G 19/22 118/16 |
| 2004/0206302 A1* | 10/2004 | Propp | ................... | A47G 19/22 118/13 |
| 2005/0214418 A1* | 9/2005 | Radow | ................... | A47G 19/22 426/132 |
| 2007/0178195 A1* | 8/2007 | Mauldin | ................ | A47G 19/22 426/106 |
| 2011/0059214 A1* | 3/2011 | Argondizzo | ............ | A23G 3/36 426/420 |
| 2012/0219685 A1* | 8/2012 | Radow | ................... | A47G 19/00 426/420 |

OTHER PUBLICATIONS

"The Brewskey." 2013. <http://www.thebrewskey.com/>. Accessed Oct. 5, 2017. (Year: 2013).*

* cited by examiner

*Primary Examiner* — Michele L Jacobson
*Assistant Examiner* — Ericson M Lachica

(57) ABSTRACT

A container assembly moistens a neck of a bottle and then applies a dry flavoring to the moistened neck. The container assembly includes a base with two side-by-side dispenser trays. One dispenser tray includes a liquid used to moisten the bottle, and another dispenser tray includes the dry flavoring used to coat portions of the moistened bottle.

11 Claims, 2 Drawing Sheets

CONTAINER ASSEMBLY THAT ADDS DRY FLAVORING TO A NECK OF A BOTTLE

BACKGROUND

Consumers often enjoy adding a dry flavoring to a neck of bottle while drinking liquid from the bottle. Beer drinkers, for example, pour water onto the neck of the beer bottle and then shake salt onto the bottle so the salt sticks to the moistened neck. The salt can then be licked or tasted while drinking the beer.

One problem with this process, however, is that it is messy since the water and salt tend to spill around the person. Another problem is that this process creates a non-uniform coating of the salt around the neck of the bottle as the salt tends to form clumps in some areas while other areas have no salt at all. Other problems exist as well, such as the salt sticking to a body of the bottle where the person grabs the bottle.

SUMMARY OF THE INVENTION

One example embodiment is a container assembly that applies a dry flavoring to a neck of the bottle. The container assembly includes a base with two side-by-side cavities. One cavity includes a dispenser tray that holds a liquid to moisten the neck of the bottle, and another dispenser tray holds dry flavoring to coat the moistened neck of the bottle. Each dispenser tray includes protrusion to engage the neck of the bottle when the liquid or dry flavoring is being applied.

Other example embodiments are discussed herein.

DETAILED DESCRIPTION

Example embodiments relate to methods and apparatus that moisten a neck of a bottle and then add a dry flavoring to the moistened neck. The neck is moistened or wetted with a liquid so the dry flavoring sticks to an outer surface of the bottle.

As noted in the Background section, consumers often enjoy adding a dry flavoring to a surface of their bottled beverage. Prior processes to add this dry flavoring were messy and created a non-uniform coating of the dry flavoring around the neck and mouth of the bottle. Example embodiments solve these problems and other problems associated with applying a dry flavoring to the outer surface of a bottle.

One example embodiment includes a container assembly that holds both a dry flavoring to add to the bottle and a liquid to moisten the bottle. The dry flavoring and the liquid are easily accessible to consumers from the container assembly that can be secured with a lid to prevent spillage and to protect the contents when not in use.

Consumers can use the container assembly to apply the liquid and the dry flavoring to the bottle without creating a mess since the liquid and the dry flavoring remain inside the container assembly and do not spill around or on the consumer.

Further yet, the container assembly applies a uniform or evenly distributed layer or coating of dry flavoring around the neck of the bottle, including the mouth. This prevents unnecessarily waist of the dry flavoring and provides the consumer with an aesthetically pleasing product since the dry flavoring evenly coats the bottle.

Further yet, the container assembly applies the dry flavoring to the neck of the bottle and prevents the dry flavoring from sticking to the body of the bottle where the consumer grabs the bottle during drinking. This further reduces messes since consumers do not get the dry flavoring all over their hands.

Consumers can also easily control how much of the bottle gets moistened and coated the dry flavoring. For example, an entire portion of the neck can be moistened and applied with the dry flavoring or only an end or mouth of the bottle can be moistened and applied with the dry flavoring.

Example embodiments thus provide consumers with a quick, convenient, and clean way to add dry flavoring to necks or ends of their bottles while consuming beverage from the bottle.

Figure 1:
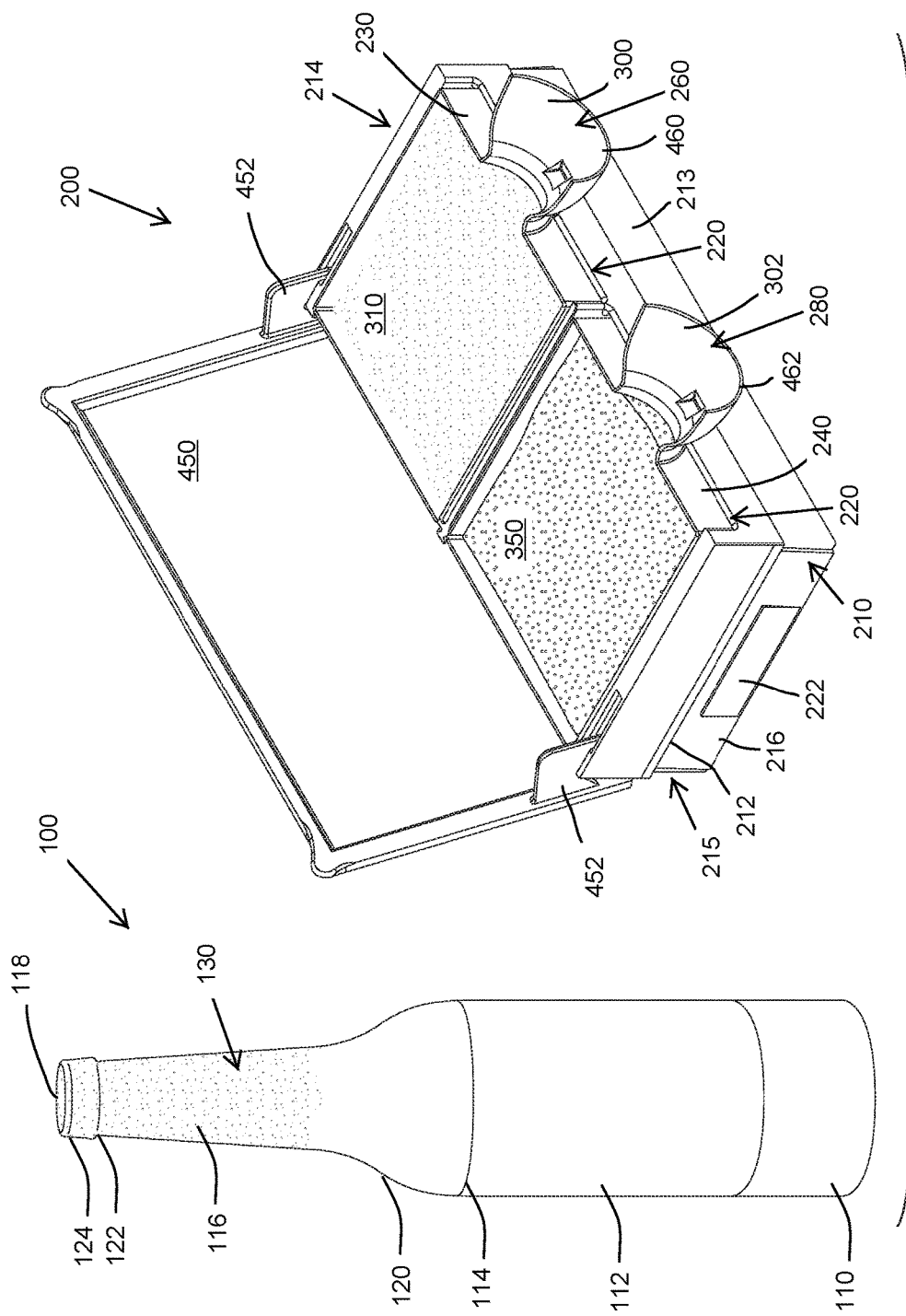
FIG. 1 shows a bottle and a container assembly that applies a dry flavoring to a neck of a bottle in accordance with an example embodiment.

FIG. 1 shows a bottle 100 and a container assembly 200. The bottle includes a base 110, a body 112 with a label 114, and an elongated neck 116. One end of the neck 116 includes an opening 118 (also known as a bore or throat), and another end of the neck 116 includes a curved shoulder 120 that transitions to the body 112 that has a generally straight cylindrical shape. The opening 118 includes a collar 122 and a mouth or lip 124 that connects with a lid (not shown).

The neck 116 includes dry flavoring 130 evenly or uniformly distributed around an outer surface of the neck. The dry flavoring extends from the shoulder 120 (or proximate to or above the shoulder) to the opening 118, including the collar 122 and the lip 124.

The bottle can have various shapes and sizes, such as being a soda bottle, a water bottle, a beer bottle, etc. and be fabricated from different materials, such as plastic bottles or glass bottles. For example, the bottle is beer bottle and has a standard size, such as a size of long neck bottle (e.g., a length of about 9 inches or more), a stubby bottle (e.g., a length of about 7 inches or less), a length of a standard bottle (e.g., a length of about 7-8 inches), or another length. For example, standard size beer bottles hold 12 ounces, have a length of about 7.5 inches, and a width of about 2-3 inches at their base.

As shown in FIG. 1, the neck 116 has an elongated tapering cylindrical shape; though bottles can also have necks with straight cylindrical shapes, rounded or curved shapes, and other shapes.

Figure 2:
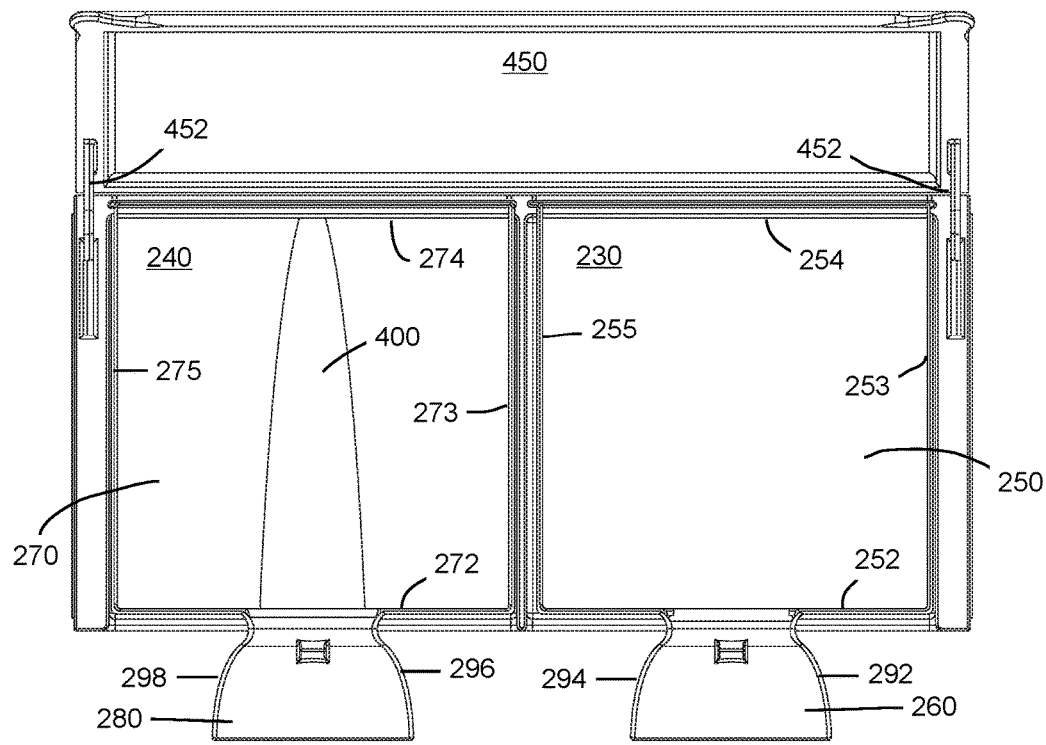
FIG. 2 shows a top view of the container assembly of FIG. 1 with the lid open and without the liquid and dry flavoring in accordance with an example embodiment.
Figure 3:
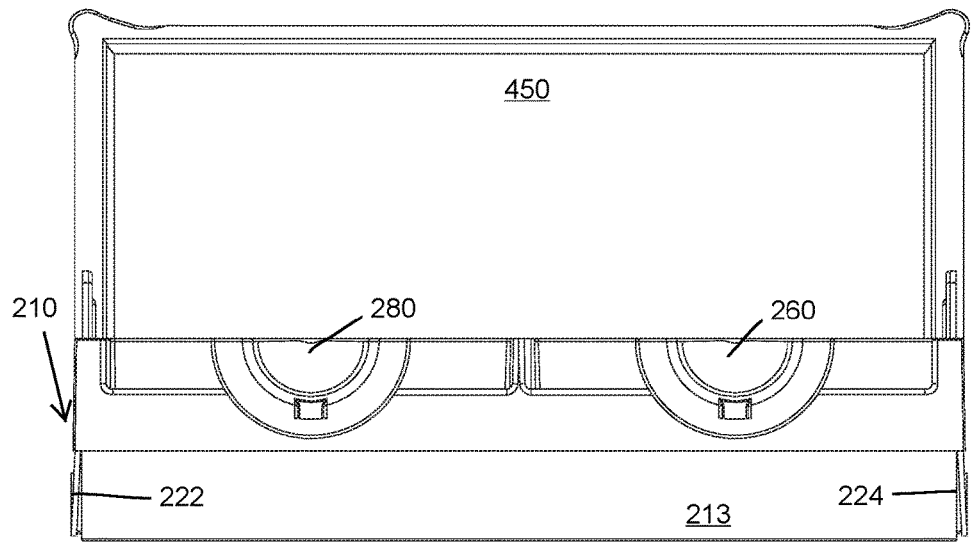
FIG. 3 shows a front view of the container assembly of FIG. 2 in accordance with an example embodiment.

Referring now to FIGS. 1-3, the container assembly 200 includes a base 210 with a bottom 212 and four side-walls 213-216 that form a cavity 220. The base 210 includes one or more drawers, such as drawers 222 and 224 shown on side-walls of the base.

Two dispenser trays 230 and 240 removably sit in or engage the base 210. The dispenser trays 230 and 240 sit on or rest on top of the base 210 in cavity 220. Walls around the cavity prevent the dispenser trays from fall out from the base.

The base and the dispenser trays are shown with a rectangular shape, but can have other shapes, such as a square shape, a curved shape, a shape with rounded corners, or another shape. Further, the dispenser trays can have identical sizes and shapes, similar sizes and shapes, or different sizes and shapes.

As best shown in FIG. 2, dispenser tray 230 includes a bottom 250 and four walls 252-255 that form a watertight enclosure, cavity, or container. A protrusion or interface 260 extends outwardly from the front wall 252. Dispenser tray 240 includes a bottom 270 and four walls 272-275 that form a watertight enclosure, cavity, or container. A protrusion or interface 280 extends outwardly from the front wall 272. The protrusions can be integrally formed in the dispenser trays or formed separately and attached thereto.

As shown in FIG. 2 from a top view, the protrusions 260 and 280 have a shape of truncated cone with rounded sides 292 and 294 for protrusion 260 and rounded sides 296 and 298 for protrusion 280. These rounded sides have a slight convex or outwardly protruding shape.

The protrusions can have different shapes and preferably have a length ranging from about one inch to about two or three inches.

As shown in FIG. 3 from a side view, the protrusions 260 and 280 have a rounded, cylindrical, or semi-circular shape with a diameter that narrows as it extends toward the front wall of the base 210.

As shown in FIG. 1 from a side perspective view, the protrusions 260 and 280 have a tapering cylindrical shape with a smooth inner surface 300 and 302, respectively. The size and shape of the tapering cylindrical shape of the protrusions emulate, match, copy, or approximate the tapering cylindrical shape of the neck 116 of the bottle 100. When the bottle 100 is inserted into the container assembly for wetting from dispenser tray 230 or applying dry flavoring from dispenser tray 240, an outer surface of the neck 116 of the bottle 100 abuts against or engages the smooth inner surface 300 or 302 so the bottle can easily rotate or spin while the liquid or dry flavoring is being applied. This smooth surface can also assist in sliding the bottle into and out of the container assembly.

An amount of curvature or an amount of arc of the protrusions 260 and 280 can vary from being slightly curved or flat to being a semi-circle (for example, as shown in FIG. 3). For instance, when the neck of the bottle is positioned in the protrusions, the protrusions cover or partially encircle about one-third to about one-half of the neck of the bottle.

As shown in FIG. 1, dispenser tray 230 includes an absorber or sponge 310 saturated with a liquid, such as water, alcohol, a flavored liquid, or another consumable liquid. The sponge 310 has a size and shape of the cavity 220 formed by the bottom 250 and four walls 252-255 of the dispenser tray 230 (see also FIG. 2).

Dispenser tray 240 includes a dry flavoring 350 that fills or partially fills the cavity 220 formed by the bottom 270 and four walls 272-275 of the dispenser tray 240 (see also FIG. 2). Examples of the dry flavoring include, but are not limited to, a dry powder, crystals, flakes, small particles, chips, etc. of a dry substance. By way of example, the substance include, but are not limited to, salt, sugar, lemon, pepper, spice, lime, a fruit flavor, or another substance consumers enjoy while consuming a bottled beverage.

As shown in FIG. 2, dispenser tray 240 includes recess, trench, or cavity 400. The cavity 400 has an elongated, tapering cylindrical shape that extends from an end 410 of protrusion 280 to back wall 274. The cavity 400 could have other shapes as well, such as a rounded shape, straight cylindrical shape, a rectangular shape, etc. The cavity 400 provides an area for the dry flavoring 350 (shown in FIG. 1) and accommodates and/or receives the neck 116 of the bottle 100.

Dispenser trays 230 and 240 are positioned side-by-side or adjacent each other in cavity 220. Further, these trays are removable from the cavity so they can be replaced, repaired, or washed. For example, plastic dispenser trays can be hand-washed or machine-washed, dried, and returned to the container assembly 200 for repeated use.

In one example embodiment, the dispenser trays 230 and 240 are identically shaped (noting though that dispenser tray 240 includes channel 400). As such, the position of the two trays is interchangeable while in the cavity 220 of the container assembly 200. For example, FIG. 1 shows the dispenser tray 240 on a left-side of the container assembly and the dispenser tray 230 on a right-side of the container assembly. The dispenser trays can be switched so the dispenser tray 240 is on the left-side and dispenser tray 230 is on the right-side.

FIG. 1 shows the two dispenser trays 230 and 240, but example embodiments include a single dispenser tray or three or more dispenser trays in the container assembly.

The container assembly 200 also includes a lid 450 that connects to the base 210 via a hinge 452. The lid rotates between a closed position and an open position (FIGS. 1-3 show the lid 450 in an open position). The lid 450 snaps or latches in the closed position to prevent the dispenser trays and their contents from falling out of the container assembly 200. When the lid is in the closed position, the protrusions 260 and 280 extend outwardly from the base 210.

A length of a side of the container assembly can vary (e.g., from about 2.5 inches to about 5 inches) in order to accommodate bottles with different size necks. For example looking to FIG. 1, the neck 116 of the bottle 100 inserts into the container assembly 200 until the shoulder 120 abuts against, engages, or hits a distal end 460 of protrusion 260 or distal end 462 of protrusion 280. These distal ends act as a stop when the bottle is inserted into the container assembly.

The container assembly provides an apparatus that enables consumers of bottled beverages to moisten a neck of a bottle and apply a dry flavoring to the neck without spilling the dry flavoring or the liquid providing the moisture. An example method includes providing the container assembly with a base and one or more side-walls that form a single cavity or multiple cavities. The assembly is further provided with one or more trays that house a liquid (or sponge and a liquid) and a dry flavoring. For example, the container assembly includes a first tray with a first protrusion shaped as a tapering cylinder from a top view of the container assembly such that the first protrusion fits partially around the neck of the bottle as the neck of the bottle spins in the first protrusion in order to moisten the neck with the liquid. The container assembly also includes a second tray with a second protrusion shaped as a tapering cylinder from a top view of the container assembly such that the second protrusion fits partially around the neck of the bottle as the neck of the bottle spins in the second protrusion in order to apply the dry flavoring to the moisten neck. The moisture or liquid on the neck of the bottle enables the dry flavoring to stick or adhere to the neck or other portions that are moistened and subsequently inserted into the tray with the dry flavoring.

Once the desired portion of the bottle is moistened and flavored, a consumer can enjoy the liquid applied to the bottle and/or the dry flavoring.

The first and second dispenser trays are sized so that the liquid and the dry flavoring apply to an external surface of the bottle from an opening of the bottle to a shoulder of the bottle. The consumer or user, however, can control how much of the neck of the bottle is moistened and hence how much of the neck or bottle retains the dry flavoring. For instance, the entire bottle from the shoulder to the opening can be coated with dry flavoring. Alternatively, just the opening can be coated with the dry flavoring.

Furthermore, during operation, the dispenser trays retain the liquid (such as water or other fluid) and/or dry flavoring such that these substance do not leak out or spill out from the trays even while a bottle is inserted into and spinning in the container assembly in order to moisten the neck or apply the dry flavoring to the wetted neck. Further, as noted, one or both of the dispenser trays can be waterproof or watertight to prevent the liquid or other substance from leaking from the container assembly.

The container assembly and/or the dispenser trays can be manufactured from plastic material by injection molding, vacuum molding, or another method. Additionally, the container assembly and/or dispenser trays can be made by hand (such as hand carved from wood) or by machine (such as made using a jig saw or hand router). As another example, example embodiments can be manufactured using Virtual Polymer Compound (VPC) or made with a 3 dimensional (3D) printer. As yet another example, example embodiments or portions of example embodiments can be made from plastic, polymers, wood, composite material, recycled fibers (such as fiber board), and combinations thereof. Furthermore, example embodiments can be made with specific logos (such as being embossed or embroidered with a name or company logo). Further yet, example embodiments can be custom-made with different colors, shapes, sizes, etc.

The methods and apparatus in accordance with example embodiments are provided as examples, and examples from one method or apparatus should not be construed to limit examples from another method or apparatus. Further, methods and apparatus discussed within different figures can be added to or exchanged with methods and apparatus in other figures. Further yet, specific numerical data values (such as specific quantities, numbers, categories, etc.) or other specific information should be interpreted as illustrative for discussing example embodiments.

What is claimed is:

1. A container assembly that moistens a neck of a beer bottle and applies a dry flavoring to the neck of the beer bottle, the container assembly comprising:
   a rectangular base with four side walls that form a cavity;
   a first plastic tray that sits in the cavity such that the first plastic tray is removable from the cavity, includes a bottom and four walls that form a first watertight enclosure, includes a protrusion that extends outwardly from one side of the container assembly of a front one of the four walls of the first plastic tray, and includes a liquid in the first watertight enclosure; and
   a second plastic tray that sits in the cavity side-by-side with the first plastic tray such that the second plastic tray is removable from the cavity, includes a bottom and four walls that form a second watertight enclosure, includes a protrusion that extends outwardly from the one side of the container assembly of a front one of the four walls of the second plastic tray, and includes the dry flavoring in the second watertight enclosure;
   wherein the protrusions of the first and second plastic trays are shaped as a truncated cone from a top view of the container assembly with the truncated cone emulating a size and a shape of the neck of the beer bottle so the protrusions receive and hold the neck of the beer bottle so a person can apply the liquid and then the dry flavoring to the neck of the bottle.

2. The container assembly of claim 1, wherein the first and second plastic trays are identically shaped and interchangeable in the cavity.

3. The container assembly of claim 1, wherein the protrusion of the first plastic tray includes a distal end surface that abuts a shoulder of the beer bottle when an end of the beer bottle is positioned in the first plastic tray, and the protrusion of the second plastic tray includes a distal end surface that abuts the shoulder of the beer bottle when the end of the beer bottle is positioned in the second plastic tray.

4. The container assembly of claim 1, wherein the second plastic tray includes an elongated channel that tapers as seen from a top view of the container assembly such that the channel narrows while extending away from an end of the protrusion of the second plastic tray.

5. The container assembly of claim 1 further comprising:
   a lid that covers the cavity, wherein the protrusions of the first and second plastic trays extend outwardly from the rectangular base from one to two inches when the lid is in a closed position.

6. The container assembly of claim 1, wherein the protrusions of the first and second plastic trays have a smooth inner surface that slides against the neck of the beer bottle as the beer bottle spins in the cavity.

7. The container assembly of claim 1, wherein the protrusions of the first and second plastic trays cover one-third to one-half of the neck of the beer bottle when the neck of the beer bottle inserts into the cavity.

8. The container assembly of claim 1 further comprising:
   a sponge that has a rectangular shape, wherein a size of the sponge emulates a size of the first watertight enclosure of the first plastic tray and fits inside the first watertight enclosure.

9. A plastic container assembly that moistens a neck of a bottle and applies a dry flavoring to the neck of the bottle, the container assembly comprising:
   a rectangular base;
   a first tray that sits in the base and includes a bottom and four walls that form a watertight enclosure housing a liquid to moisten the neck of the bottle and includes a cylindrically-shaped protrusion that extends outwardly from one side of the container assembly of a front one of the four walls of the first tray; and
   a second tray that sits side-by-side to the first tray in the base and includes a bottom and four walls that form an enclosure housing the dry flavoring that applies to the neck of the bottle and includes a cylindrically-shaped protrusion that extends outwardly from the one side of the container assembly from a front one of the four walls of the second tray;
   wherein the protrusions of the first and second trays have a semi-circular shape from a front view of the container assembly, include a smooth inner surface that supports and engages the neck while the neck spins in the protrusions to apply the liquid and the dry flavoring to the neck.

10. The container assembly of claim 9, wherein the protrusions of the first and second trays have a shape of a truncated cone with a length between one inch to two inches.

11. The container assembly of claim 9, wherein the protrusions of the first and second trays have a shape that emulates a shape of the neck of the bottle.

* * * * *